United States Patent
Shimoda (10) Patent No.: US 9,199,276 B2
(45) Date of Patent: Dec. 1, 2015

(54) SIGNAL PROCESSING CIRCUIT, VIBRATION DETECTION CIRCUIT, AND ELECTRONIC DEVICE

(75) Inventor: Sadashi Shimoda, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 814 days.

(21) Appl. No.: 13/433,420

(22) Filed: Mar. 29, 2012

(65) Prior Publication Data

US 2012/0248895 A1    Oct. 4, 2012

(30) Foreign Application Priority Data

Mar. 30, 2011  (JP) .................. 2011-075586

(51) Int. Cl.
| | |
|---|---|
| H01H 35/14 | (2006.01) |
| H01H 37/00 | (2006.01) |
| H01H 47/24 | (2006.01) |
| H01H 47/26 | (2006.01) |
| B06B 1/02 | (2006.01) |
| G01P 15/135 | (2006.01) |

(52) U.S. Cl.
CPC ............ B06B 1/0207 (2013.01); G01P 15/135 (2013.01); H01H 35/144 (2013.01); Y10T 307/773 (2015.04)

(58) Field of Classification Search
CPC ... B06B 1/0207; H01H 35/144; G01P 15/135
USPC ........................................................ 307/117
See application file for complete search history.

(56) References Cited

U.S. PATENT DOCUMENTS

| | | | | |
|---|---|---|---|---|
| 3,553,482 A | * | 1/1971 | Tavis ............................. | 307/121 |
| 3,681,661 A | * | 8/1972 | Koegel ........................... | 361/72 |
| 5,631,834 A | * | 5/1997 | Tsurushima et al. .......... | 701/45 |
| 5,828,138 A | * | 10/1998 | McIver et al. ................ | 307/10.1 |
| 6,072,247 A | * | 6/2000 | Lammert et al. ............. | 307/10.1 |

FOREIGN PATENT DOCUMENTS

JP        2002055114        2/2002

* cited by examiner

*Primary Examiner* — Jared Fureman
*Assistant Examiner* — Esayas Yeshaw
(74) *Attorney, Agent, or Firm* — Adams & Wilks (57) ABSTRACT

A signal processing circuit detects vibration applied to an acceleration switch. A main determination section connectable to the acceleration switch compares an output of the acceleration switch to a preset first determination criterion to determine the vibration applied to the acceleration switch. A power supply control section control supply of power based on a result of the determination made by the main determination section. A main control section controls a control target based on the power supplied from the power supply control section. A sensor detects a physical quantity applied to the sensor based on the power supplied from the power supply control section. The power supply control section controls the supply of the power to at least one of the main control section and the sensor based on the result of the determination made by the main determination section as to the vibration applied to the acceleration switch.

20 Claims, 4 Drawing Sheets

Prior Art

SIGNAL PROCESSING CIRCUIT, VIBRATION DETECTION CIRCUIT, AND ELECTRONIC DEVICE

BACKGROUND OF THE INVENTION

1. Field of the Invention

The present invention relates to a signal processing circuit, a vibration detection circuit, and an electronic device.

2. Description of the Related Art

Figure 8:
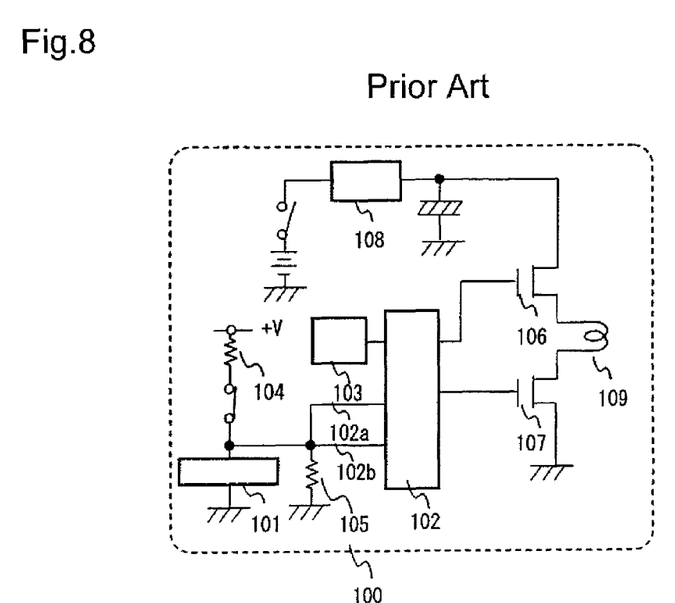
FIG. 8 is a block diagram illustrating an example of a conventional signal processing circuit.

Referring to FIG. 8, a conventional signal processing circuit is described by exemplifying a typically known occupant protection device using an air bag. It is noted that the occupant protection device uses the signal processing circuit in order to fire a detonator for inflating the air bag based on impact detected by an acceleration switch and an acceleration sensor.

A signal processing circuit 100 illustrated in FIG. 8 for a normally open acceleration switch used in the occupant protection device includes an acceleration switch 101, a microcomputer 102, and an acceleration sensor 103. A first resistor 104 and a second resistor 105 are connected in series between a power supply line and the ground. A connection point between the first resistor and the second resistor is grounded via the acceleration switch 101. The connection point is further connected to a first port 102a and a second port 102b of the microcomputer 102 so that the first port is set as an input port and the second port is set as a Low level output/input port.

When vibration of a predetermined value or more is applied to the acceleration switch 101, the acceleration switch becomes the closed state, and the microcomputer 102 detects the open/closed state of the acceleration switch based on a voltage change via the second port 102b. The microcomputer 102 subsequently detects an output of the acceleration sensor 103, and, when it is determined based on the output result that the vibration of the predetermined value or more has been applied to the acceleration sensor, the microcomputer 102 switches switching field-effect transistors 106 and 107 into the closed state, to thereby supply an ignition current to a detonator 109 from the power supply line via a DC/DC converter 108.

In the signal processing circuit used in the occupant protection device described above, the microcomputer needs to be operated all the time in order to constantly detect the vibration applied to the acceleration switch. The microcomputer also needs to drive the sensor constantly and prepare for detection of the output signal of the sensor. Those technologies are described in a publication of Japanese Patent Publication No. 2002-55114.

In the above-mentioned signal processing circuit using the acceleration switch, the sensor, and the microcomputer in combination, it is necessary to constantly drive the sensor for detecting vibration or acceleration and also supply power for operating the microcomputer. Particularly in the case where the signal processing circuit is incorporated in a device that can mount only a small-capacity battery, it is necessary not to waste electric power of the battery by configuring a system including the signal processing circuit so as to stand by when no vibration is detected and operate in response to the detection of vibration.

SUMMARY OF THE INVENTION

The present invention has been made in view of the above-mentioned circumstances, and it is an object thereof to provide a signal processing circuit in which, when vibration of less than a predetermined value is applied to an acceleration switch, a main control section or a sensor is stopped or operated with low current, and, when vibration of the predetermined value or more is applied to the acceleration switch, the main control section or the sensor is activated and, after the main control section is activated, the supply of power to the acceleration switch or the sensor is controlled so as to further reduce current consumption of an overall system, and to also provide a vibration detection circuit and an electronic device including the signal processing circuit.

In order to solve the above-mentioned problem, the present invention proposes the following measures.

According to the present invention, there is provided a signal processing circuit for detecting vibration applied to an acceleration switch based on an open/closed state of the acceleration switch, the signal processing circuit including: a main determination section for comparing an output of the acceleration switch to a preset first determination criterion, to thereby determine the vibration applied to the acceleration switch; a power supply control section for controlling supply of power based on a result of the determination made by the main determination section; a main control section for controlling a control target based on the power supplied from the power supply control section; and a sensor for detecting a physical quantity applied to the sensor based on the power supplied from the power supply control section, and outputting a result of the detection as physical quantity measurement information, in which the acceleration switch is connected to the main determination section, and the power supply control section controls the supply of the power to at least one of the main control section and the sensor based on the result of the determination made by the main determination section as to the vibration applied to the acceleration switch.

According to this aspect of the present invention, based on the result of the determination made by the main determination section as to the vibration applied to the acceleration switch, the power supply control section stops supplying power to the main control section or the sensor so that no current is consumed when the main control section and the sensor is stopped, and, when the vibration is applied to the acceleration switch, the power supply control section supplies power to the main control section or the sensor. Thus, current consumption of an overall system including the acceleration switch and the signal processing circuit can be reduced.

Further, in the above-mentioned signal processing circuit, the acceleration switch is connected to the power supply control section, and the power supply control section controls supply of power to the acceleration switch based on the result of the determination made by the main determination section as to the vibration applied to the acceleration switch.

According to this aspect of the present invention, in addition to the above-mentioned configuration, the supply of power to the acceleration switch is controlled, and hence a current to be supplied to the acceleration switch can be reduced. Thus, the current consumption of the overall system including the acceleration switch and the signal processing circuit can be reduced.

Further, in the above-mentioned signal processing circuit, the main control section includes a determination function of comparing the physical quantity measurement information output from the sensor to a preset second determination criterion and determining a state of the physical quantity applied to the sensor, and the power supply control section controls supply of power to the acceleration switch based on a result of the determination as to the state of the physical quantity applied to the sensor.

According to this aspect of the present invention, in addition to above-mentioned configuration, the power supply control section controls the supply of power to the acceleration switch based on the physical quantity measurement information output from the sensor, and hence the current to be supplied to the acceleration switch can be reduced as necessary. Thus, the current consumption of the overall system including the acceleration switch and the signal processing circuit can be reduced.

Further, the above-mentioned signal processing circuit further includes a determination section including the main determination section and a potential level switching section for changing a potential on an input side of the determination section, in which the main control section causes the potential level switching section to change the potential on the input side of the determination section based on the result of the determination made by the main determination section.

According to this aspect of the present invention, in addition to the above-mentioned configuration, the main control section causes the potential level switching section to change the potential on the input side of the determination section based on the result of the determination as to the vibration applied to the acceleration switch, and hence the current flowing through the acceleration switch when the acceleration switch is in the closed state can be reduced. Thus, the current consumption of the overall system including the acceleration switch and the signal processing circuit can be reduced more.

Further, the above-mentioned signal processing circuit further includes a determination section including the main determination section and a potential level switching section for changing a potential on an input side of the determination section, in which the main control section causes the potential level switching section to change the potential on the input side of the determination section based on the result of the determination as to the state of the physical quantity applied to the sensor.

According to this aspect of the present invention, in addition to the above-mentioned configuration, the main control section determines the state of the physical quantity applied to the sensor and causes the potential level switching section to change the potential on the input side of the determination section based on the result of the determination, and hence the current to be supplied when the acceleration switch is in the closed state can be reduced. Thus, the current consumption of the overall system including the acceleration switch and the signal processing circuit can be reduced more.

According to the present invention, there is provided a vibration detection circuit, including: the above-mentioned signal processing circuit; and the acceleration switch, in which the main control section controls the control target based on one of the result of the determination made by the main determination section as to the vibration applied to the acceleration switch and the result of the determination made by the main determination section as to the state of the physical quantity applied to the sensor.

According to this aspect of the present invention, the main control section activates or stops the control target based on the result of the determination as to the vibration applied to the acceleration switch, to thereby control a current of the vibration detection circuit including the acceleration switch and the signal processing circuit, and hence current consumption of the vibration detection circuit can be reduced. Thus, current consumption of an overall system including the vibration detection circuit and the control target can be reduced.

Further, according to the present invention, there is provided an electronic device, including: the above-mentioned signal processing circuit; the acceleration switch; and the control target, in which the main control section controls the control target based on one of the result of the determination made by the main determination section as to the vibration applied to the acceleration switch and the result of the determination made by the main determination section as to the state of the physical quantity applied to the sensor.

According to this aspect of the present invention, the main control section controls the operation of the control target in addition to the acceleration switch and the signal processing circuit based on the result of the determination as to the vibration applied to the acceleration switch, and hence the current consumption of each of the signal processing circuit, the acceleration switch, and the control target can be reduced. Thus, current consumption of an overall system of the electronic device can be reduced.

According to the signal processing circuit, the vibration detection circuit, and the electronic device of the present invention, it is possible to configure a system in which a drive current of the signal processing circuit can be significantly reduced when the vibration applied to the acceleration switch is smaller than a predetermined value. Also when the vibration applied to the acceleration switch is equal to or larger than the predetermined value, power to be supplied to the acceleration switch is controlled from when the main control section or the sensor is activated to when the main control section or the sensor stops its operation, and hence the current flowing through the acceleration switch can be suppressed. Thus, the current consumption of the overall system including the acceleration switch and the signal processing circuit can be reduced.

DETAILED DESCRIPTION OF THE PREFERRED EMBODIMENTS (First Embodiment)

A signal processing circuit according to a first embodiment of the present invention is described with reference to FIGS. 1 to 3. At first, an acceleration switch to be connected to the signal processing circuit is described with reference to FIGS. 1 and 2.

Figure 1:
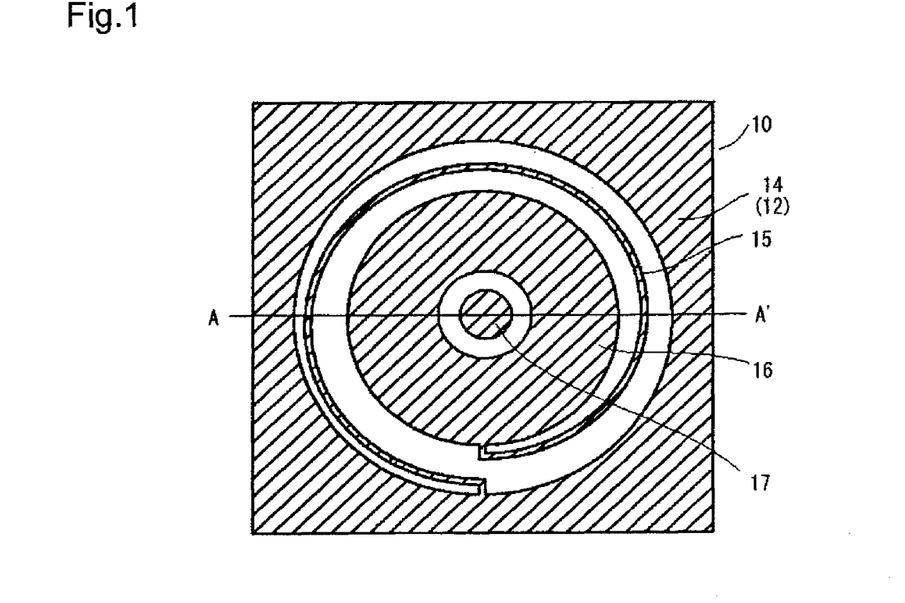
FIG. 1 is a cross-sectional view illustrating a configuration of an acceleration switch.

FIG. 1 is a cross-sectional view illustrating a configuration of an acceleration switch 10 including a counter electrode to be described later in a space inside a weight. FIG. 2 is a vertical cross-sectional view of the acceleration switch 10 taken along the plane A-A' of FIG. 1. Note that, FIG. 1 is a cross-sectional view taken along the plane B-B of FIG. 2.

Figure 2:
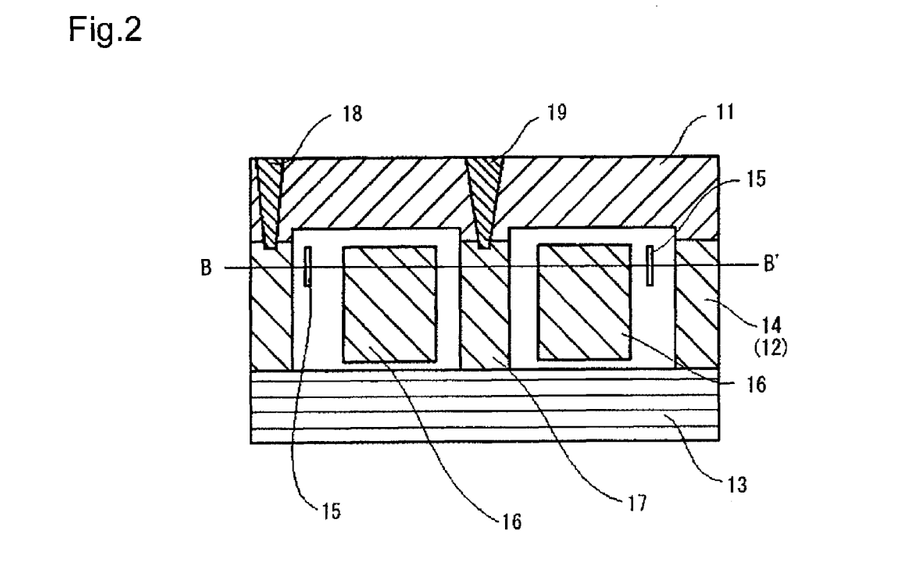
FIG. 2 is a vertical cross-sectional view illustrating the configuration of the acceleration switch.
Figure 3:
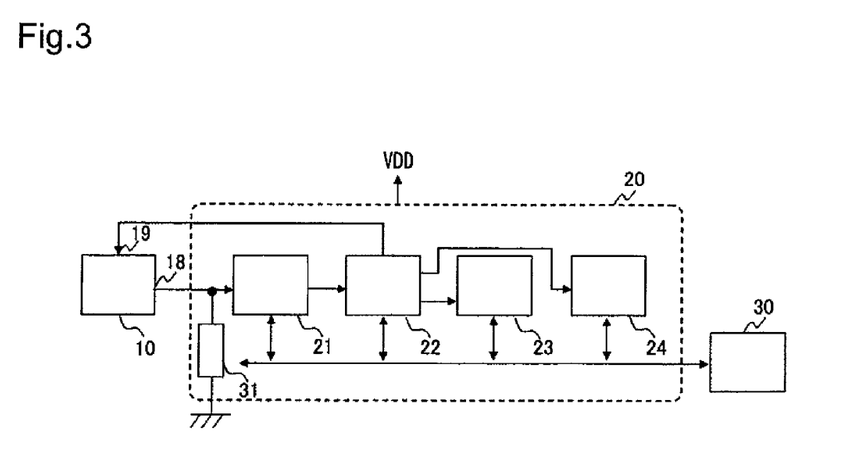
FIG. 3 is a block diagram illustrating a signal processing circuit according to a first embodiment of the present invention.

The acceleration switch 10 illustrated in FIGS. 1 and 2 has a configuration in which a first substrate 11 using an insulating material, a second substrate 12 using monocrystalline silicon or the like, and a third substrate 13 using an insulating material such as glass are laminated on one another. A support portion 14 is disposed at a peripheral part of the acceleration switch. A beam 15 is fixed to the support portion 14. A weight 16 has a space formed inside and is supported by the support portion 14 through the intermediation of the beam 15. A counter electrode 17 is disposed in the space inside the weight 16. When acceleration having a given value or more is applied, the counter electrode 17 restricts the movement of the weight and comes into contact with the weight to establish electrical conduction to the weight. Note that, the second substrate 12 is made of monocrystalline silicon in order to establish electrical conduction to the support portion 14, the beam 15, the weight 16, and the counter electrode 17. Through electrodes 18 and 19 are each formed by filling a conductive material such as gold into the first substrate 11, thereby serving as a contact for electrically connecting the acceleration switch to the signal processing circuit to be described later. Note that, the first substrate 11 and the third substrate 13 are fixed to the support portion 14 and the counter electrode 17 by anodic bonding or other methods, and have another function of protecting the beam 15 and the weight 16 from external environment.

The acceleration switch 10 is a normally open acceleration switch, which becomes a closed state in which the through electrodes 18 and 19 are conductive when the intensity of vibration applied to the acceleration switch becomes equal to or larger than a predetermined value, and becomes an open state in which the through electrodes 18 and 19 are not conductive when the intensity of vibration is smaller than the predetermined value.

Next, the signal processing circuit according to the first embodiment of the present invention is described with reference to FIG. 3. FIG. 3 is a block diagram illustrating a configuration of a signal processing circuit 20 to be connected to the acceleration switch 10. The signal processing circuit 20 includes a main determination section 21, a power supply control section 22, a main control section 23, and a sensor 24.

The main determination section 21 is connected to one terminal (through electrode 18) of the acceleration switch 10 so as to detect the open/closed state of the acceleration switch, and compares the resultant detection signal to a preset determination criterion to determine the occurrence of vibration, which is then output as a determination result.

Based on the determination result of the main determination section 21, the power supply control section 22 controls the supply of power to the main control section 23 to perform control of activation and suspension of the main control section 23 and control of switching between a low current mode and a normal operation mode thereof, and controls the supply of power to the sensor 24 to perform control of activation and suspension of the sensor 24 and control of switching between a low current mode and a normal operation mode thereof.

The power supply control section 22 is further connected to another terminal (through electrode 19) of the acceleration switch 10 so as to supply power to the acceleration switch 10 and control voltage and current to be supplied thereto.

The main control section 23 operates based on the power supplied from the power supply control section 22 and controls the operation of a control target 30. The main control section 23 further receives an acceleration detection result of the sensor 24 to be described later as acceleration (physical quantity) measurement information, and compares the acceleration measurement information to a preset determination criterion, thereby determining the vibration applied to the sensor.

Figure 4:
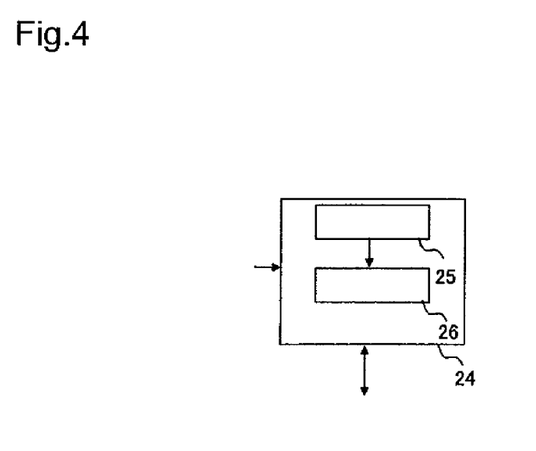
FIG. 4 is an explanatory diagram illustrating a detailed configuration of a sensor.

The sensor 24 operates based on the power supplied from the power supply control section 22 to detect acceleration (physical quantity) applied thereto and outputs a result of the detection to the main control section 23 as acceleration (physical quantity) measurement information. As illustrated in FIG. 4, the sensor 24 includes an acceleration (physical quantity) detection section 25 and an A/D conversion section 26, and has a function of detecting acceleration by the acceleration detection section, converting an analog value into a digital value by the A/D conversion section, and outputting the converted digital value as the acceleration measurement information.

The signal processing circuit 20 further includes a load 31 formed of a resistor or a capacitor. The load 31 is connected between the one end (through electrode 18) of the acceleration switch 10 and an input of the main determination section 21, and has a function of adjusting an input-side potential of the main determination section 21 when the acceleration switch is OFF (in the open state). The load 31 may be formed of a resistor and a capacitor in combination in series or parallel connection, or may alternatively be formed of an active element such as a transistor so that the load resistance is substantially changed by the output of the main control section 23.

Next, the operation of the signal processing circuit 20 is described with reference to FIG. 3. Described first is the operation performed in a state in which no vibration is applied to the acceleration switch 10 or in a low vibrational state in which vibration of less than a predetermined value is applied. In this state, the main determination section 21 detects the open/closed state of the acceleration switch 10 and compares the resultant detection signal to a preset first determination criterion to determine as the low vibrational state. Based on the determination result, the power supply control section 22 stops the main control section 23 or sets the main control section 23 to a low current mode in which only a part of the functions thereof operates. The power supply control section 22 further controls the supply of power to the acceleration switch 10. It is noted that an output voltage supplied to the acceleration switch 10 is set to High level similar to a positive power supply voltage VDD. In the low vibrational state, the acceleration switch 10 is normally OFF (in the open state), and the input side of the main determination section 21 is pulled down by the load 31 and is thus at Low level similar to a negative power supply voltage VSS.

Next, the operation of the signal processing circuit 20 performed in a high vibrational state in which vibration of the predetermined value or more is applied to the acceleration switch 10 is described. In this state, the acceleration switch 10 becomes the closed state, and the main determination section 21 detects the open/closed state of the acceleration switch and compares the resultant detection signal to the preset first determination criterion to determine that the vibration has been applied to the acceleration switch. Based on the determination result, the power supply control section 22 activates the main control section 23 or switches the main control section 23 to a normal operating mode of executing normal functions. The power supply control section 22 further controls the supply of power to the acceleration switch based on the determination result of the main determination section 21 so that the current to be supplied to the acceleration switch is reduced or brought to zero. In the signal processing circuit 20, the current flowing via the acceleration switch 10 and the load 31 can be reduced or brought to zero even in the high vibrational state. Thus, current consumption of an overall system including the signal processing circuit can be reduced.

Next, the operation of the signal processing circuit 20 performed when the measurement of acceleration is started in the high vibrational state and the state shifts to the low vibrational state is described. In order to start the measurement of acceleration by the sensor 24, the power supply control section 22 first outputs a sensor activation signal to activate the sensor 24 or switch the sensor 24 to the normal operating mode. In response thereto, the sensor 24 starts detecting the acceleration by the acceleration detection section 25, converts an analog value detected by the acceleration detection section into a digital value by the A/D conversion section 26, and outputs the converted digital value to the main control section 23 as the acceleration measurement information containing the operating state of the sensor 24.

It is noted that the main control section 23 controls the operation of the control target based on the acceleration measurement information. The main control section 23 compares the acceleration measurement information to a preset second determination criterion, and when determining that the state of the acceleration is different from normal one, the main control section 23 outputs a control signal to operate (activate) the control target 30. On the other hand, when determining that the acceleration applied to the sensor 24 falls below the second determination criterion within a predetermined period of time, the main control section 23 outputs a stop signal based on the determination result to the power supply control section 22. Based on the stop signal, the power supply control section 22 stops the main control section 23 and the sensor 24 or sets the main control section 23 and the sensor 24 to the low current mode. Based on the stop signal, the power supply control section 22 further controls the supply of power to the acceleration switch to set the output voltage supplied to the acceleration switch 10 to High level from Low level so that the main determination section 21 is capable of detecting the open/closed state of the acceleration switch 10 to determine the vibration.

As described above, in the signal processing circuit 20 for an acceleration switch according to the present invention, in the low vibrational state, the main control section 23 and the sensor 24 are stopped or set to the low current mode so as to reduce the current consumption, and, in the high vibrational state, the current flowing through the acceleration switch 10 and the load 31 is reduced or brought to zero. Thus, the current consumption of the overall system including the signal processing circuit can be reduced. It is noted that the main control section 23 may be configured to first activate the control target 30 and subsequently stop the control target from the determination result based on the acceleration measurement information of the sensor 24. In this case, the main control section can activate the control target in a shorter period of time.

(Second Embodiment)

Figure 5:
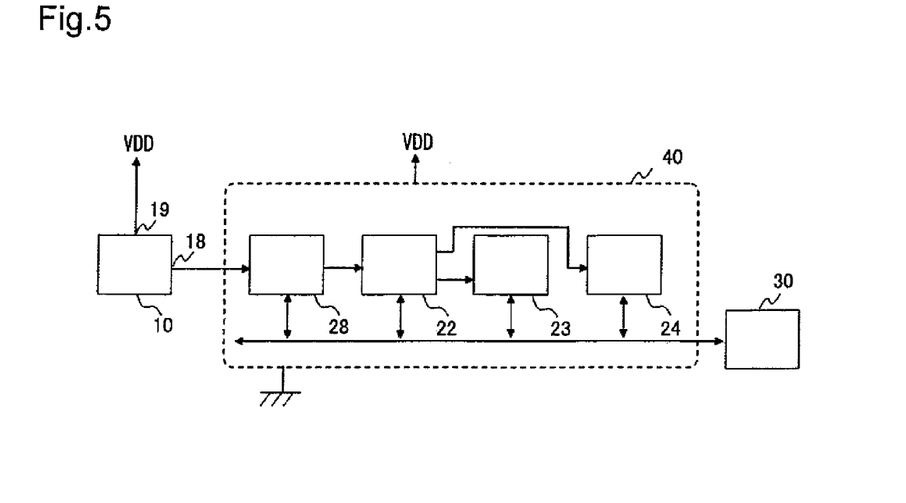
FIG. 5 is a block diagram illustrating a signal processing circuit according to a second embodiment of the present invention.
Figure 6:
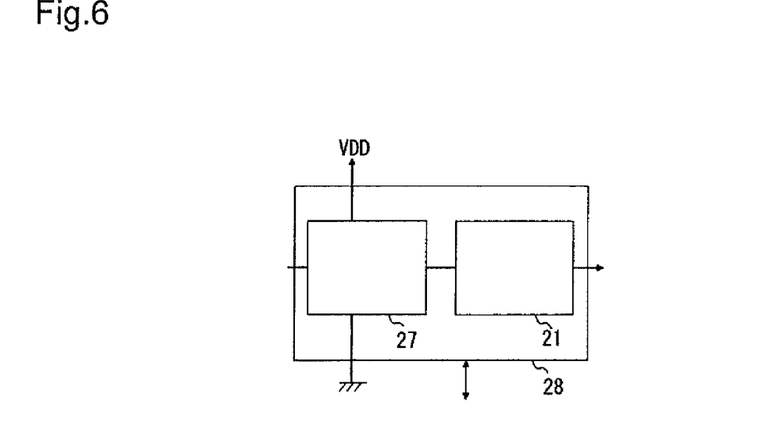
FIG. 6 is an explanatory diagram illustrating a detailed configuration of a determination section.

Next, a signal processing circuit according to a second embodiment of the present invention is described with reference to FIGS. 5 and 6. FIG. 5 is a block diagram illustrating a signal processing circuit 40 having a partially different configuration from the signal processing circuit 20 of the first embodiment illustrated in FIG. 3. FIG. 6 is a block diagram illustrating a configuration of a determination section 28 included in the signal processing circuit 40. The signal processing circuit 40 includes the power supply control section 22, the main control section 23, the sensor 24, and the determination section 28. The determination section 28 includes the main determination section 21 and a potential level switching section 27. The potential level switching section 27 is provided on the input side of the main determination section 21 and, in accordance with the control of the main control section 23, changes the input side to a pulled-down state, a pulled-up state, or a disabled state (high impedance). The signal processing circuit 40 does not need to be provided with the load 31 illustrated in the signal processing circuit of FIG. 3 because the determination section 28 is included.

The input side of the determination section 28 is connected to one end (through electrode 18) of the acceleration switch 10 so that the determination section 28 detects the open/closed state of the acceleration switch. The determination section 28 then compares the resultant detection signal to a preset first determination criterion to determine by the main determination section 21 the occurrence of vibration applied to the acceleration switch, and outputs the determination result to the power supply control section 22.

Next, the operation of the signal processing circuit 40 for an acceleration switch is described with reference to FIG. 5. The main control section 23 first sets the input side of the determination section 28 to the disabled state (high impedance). If this state changes to a high vibrational state in which vibration of a predetermined value or more is applied, the acceleration switch 10 becomes the closed state, and the determination section 28 receives a High level input and compares the input to the first determination criterion to detect the occurrence of the vibration. Based on the determination result, the power supply control section 22 supplies power to the main control section 23 to activate the main control section 23. After that, the main control section 23 switches the input side of the determination section 28 to the pulled-up state or maintains the input side to the disabled state. With this, even if the acceleration switch 10 changes again to the closed state, no current flows to the input side of the determination section 28, and hence the current flowing through the acceleration switch is zero. After that, the power supply control section 22 supplies power to the sensor 24 to activate the sensor 24. The sensor then starts acceleration detection to measure real-time acceleration applied to the sensor, and outputs the measured acceleration to the main control section 23 as acceleration measurement information.

Based on the acceleration measurement information, the main control section 23 extracts, for a predetermined period of time, the acceleration applied to the sensor 24 as the acceleration measurement information, and compares the extracted acceleration to a second determination criterion for detecting acceleration that occurs under a predetermined condition, such as a seismic wave. When the main control section 23 determines that the state of the acceleration is different from normal one (determines as the seismic wave), the main control section 23 activates the control target 30 to operate the control target for a predetermined period of time, and then stops the control target. On the other hand, when the main control section 23 determines the state of the acceleration as the normal state, the main control section 23 maintains the stop state of the control target. After that, the main control section 23 changes the input side of the determination section 28 to the pulled-down state and then to the disabled state, and, in order to reduce current consumption of the sensor 24, outputs a control signal for stopping the acceleration detection made by the sensor to the power supply control section 22. After that, the power supply control section 22 stops the main control section 23 to reduce current consumption of the signal processing circuit 40. Note that, in the case where this state changes to the state in which vibration of the preset first determination criterion or more is applied to the acceleration switch 10 and the acceleration switch 10 becomes the closed state again, High level is input to the determination section 28, and the power supply control section 22 supplies power to the main control section 23 or the sensor 24 again based on the determination result of the determination section.

It is noted that in the case where the determination section included in the signal processing circuit is incapable of switching between the pulled-down state and the pulled-up state, a circuit for switching between the pulled-down state and the pulled-up state may be connected to the input side of the determination section so as to switch between the pulled-down state and the pulled-up state. Alternatively, a circuit having an input condition changing function using an active element such as a transistor may be connected to the input side of the determination section so as to produce the pulled-down state or the disabled state.

In the signal processing circuit of each of the embodiments described above, as an example, when High level is applied as the input signal of the determination section, the signal is output (interrupt output) to the power supply control section 22. Alternatively, the signal may be output when Low level is applied to the determination section. In this case, in the configuration of the signal processing circuit illustrated in FIG. 3 or 5, the negative power supply connected to the load 31 may be replaced by the positive power supply (VDD), the positive power supply (VDD) connected to the acceleration switch may be replaced by the negative power supply, and the pulled-down state, the pulled-up state, and the High level may be replaced by the pulled-up state, the pulled-down state, and the Low level, respectively. Also in this case, the object of the present invention, that is, the reduction of the current flowing through the main control section or the sensor of the signal processing circuit in the low vibrational state and the reduction of the current flowing through the acceleration switch in the high vibrational state, can be achieved.

(Third Embodiment)

Next, as a third embodiment of the present invention, a battery-driven seismometer, which is an example of an electronic device that includes the signal processing circuit according to the first embodiment and performs a predetermined operation based on a result of detection as to vibration applied to the acceleration switch, is described with reference to a block diagram of FIG. 7.

Figure 7:
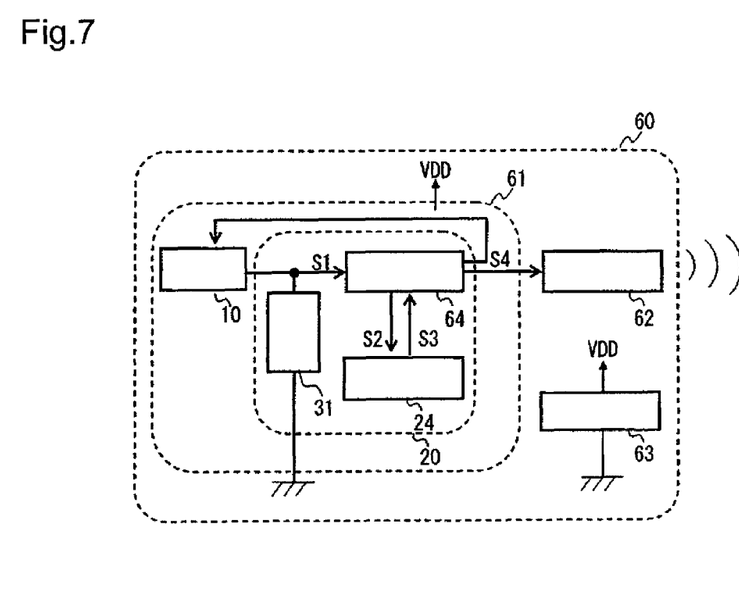
FIG. 7 is a block diagram illustrating an electronic device according to a third embodiment of the present invention.

FIG. 7 is a block diagram of a seismometer 60 that includes the acceleration switch and the signal processing circuit and mounts a small capacity battery. The seismometer 60 includes a vibration detection circuit 61, alarm issuing means 62 corresponding to a control target for issuing sound, light, or data, and a battery 63 for supplying power to the vibration detection circuit 61 and the alarm issuing means 62. The vibration detection circuit 61 includes the acceleration switch 10 and the signal processing circuit 20 (40) and is configured to activate a microcomputer 64 and the sensor 24 when vibration of a predetermined value or more is applied to the acceleration switch. The microcomputer 64 includes the main determination section 21, the power supply control section 22, and the main control section 23 illustrated in the block diagram of the signal processing circuit of FIG. 3 or 5. Note that, the seismometer illustrated in FIG. 7 includes the signal processing circuit 20 according to the first embodiment, but may include the signal processing circuit 40 including the determination section 28 according to the second embodiment instead of the signal processing circuit 20.

The main control section 23 included in the microcomputer 64 has a function of determining a seismic wave and a control function of controlling a control target. In the sensor 24, the A/D conversion section 26 converts a result of detection of acceleration detected by the acceleration detection section 25 into acceleration measurement information, which is then output to the main control section 23. The main control section 23 compares the acceleration measurement information output from the sensor 24 to a preset criterion to determine whether an earthquake has occurred or not. Based on a result of the determination, the main control section 23 performs control to activate or stop the control target. The alarm issuing means 62 has a function of generating sound, light, or the like via a speaker or light emitting means based on a control signal S4 of the main control section 23 included in the microcomputer 64.

Next, an operation of the seismometer 60 is described with reference to FIG. 7. When the vibration applied to the acceleration switch 10 is smaller than a predetermined value, the signal processing circuit 20 (40) included in the seismometer maintains the standby or stop state, and the alarm issuing means 62 also maintains the standby state. On the other hand, when the vibration applied to the acceleration switch is equal to or larger than the predetermined value, the main determination section 21 detects an output signal (S1) indicating the open/closed state of the acceleration switch and compares the output signal to a preset predetermined value, thereby determining the occurrence of the vibration applied to the acceleration switch 10. Based on the result of the determination, the power supply control section 22 activates the main control section 23. Further, the main control section 23 outputs an activation signal (S2) to the sensor 24 to cause the sensor to start acceleration detection. The sensor 24 detects the acceleration and outputs acceleration measurement information (S3) obtained by converting the result of the detection into a digital value. The main control section 23 compares the acceleration measurement information (S3) to a preset determination criterion. When the main control section 23 determines that an earthquake has occurred, the main control section 23 outputs, based on the result of the determination, the control signal (S4) to the alarm issuing means 62. Based on the control signal (S4), the alarm issuing means 62 issues sound, light, or data as an alarm to the surroundings via a speaker, a light emitting device, a wireless device, or the like. Note that, after the alarm is issued for a predetermined period of time, the main control section 23 stops the alarm issuing means and causes the power supply control section 22 to stop the supply of power to the main control section 23 and the sensor 24, and then the microcomputer 64 is switched to the low current mode and the seismometer 60 shifts to the standby state.

As described above, in the electronic device according to the present invention, the determination as to the vibration applied to the acceleration switch 10 is performed by the main determination section 21, and based on the result of the determination, the power supply control section 22 included in the microcomputer 64 supplies power to the main control section 23 and the sensor 24 to activate the main control section 23 and the sensor 24. Subsequently, the main control section 23 causes the sensor 24 to start measuring acceleration to obtain measurement information of the acceleration applied to the sensor, and compares the measurement information to the preset determination criterion. When the main control section 23 determines that an earthquake has occurred, the main control section 23 activates the control target so as to start a predetermined operation, such as issuing an alarm including sound and light or communicating to another terminal or the like. On the other hand, when the main control section 23 included in the microcomputer 64 determines that an earthquake has not occurred or that vibration of less than a predetermined value has been applied to the acceleration switch, the main control section 23 performs control to stop the operation of the control target. In this way, the current consumption of the electronic device itself can be reduced, and hence the frequency of battery replacement of the electronic device can be reduced.

It is noted that in the signal processing circuit and the electronic device according to the embodiments of the present invention, a sensor for measuring acceleration has been described as an example. The invention is not limited to a sensor for measuring acceleration, however, and various types of sensors for measuring a physical quantity such as a thermo-hygrometer, a gyroscope, and a pressure gauge may be included. The sensors each detect the physical quantity applied thereto and, based on the physical quantity measurement information as a set of the detection results, the power supply control section controls the supply of power so that the main control section and the sensors are appropriately activated, stopped, or switched to the low current mode, to thereby reduce the current consumption of the signal processing circuit.

What is claimed is:

1. A signal processing circuit for detecting vibration applied to an acceleration switch based on an open/closed state of the acceleration switch, the signal processing circuit comprising:
a main determination section configured for connection to the acceleration switch for comparing an output of the acceleration switch to a preset first determination criterion to thereby determine the vibration applied to the acceleration switch;
a power supply control section for controlling supply of power based on a result of the determination made by the main determination section;
a main control section for controlling a control target based on the power supplied from the power supply control section; and
a sensor for detecting a physical quantity applied to the sensor based on the power supplied from the power supply control section, and for outputting a result of the detection as physical quantity measurement information,
wherein the power supply control section controls the supply of the power to at least one of the main control section and the sensor based on the result of the determination made by the main determination section as to the vibration applied to the acceleration switch.

2. A signal processing circuit according to claim 1, wherein the power supply control section is configured for connection to the acceleration switch for controlling supply of power to the acceleration switch based on the result of the determination made by the main determination section as to the vibration applied to the acceleration switch.

3. A signal processing circuit according to claim 1, wherein the main control section includes a determination function of comparing the physical quantity measurement information output from the sensor to a preset second determination criterion and determining a state of the physical quantity applied to the sensor; and wherein the power supply control section controls supply of power to the acceleration switch based on a result of the determination as to the state of the physical quantity applied to the sensor.

4. A signal processing circuit according to claim 1, further comprising a determination section including the main determination section and a potential level switching section for changing a potential on an input side of the determination section; wherein the main control section causes the potential level switching section to change the potential on the input side of the determination section based on the result of the determination made by the main determination section.

5. A signal processing circuit according to claim 3, further comprising a determination section including the main determination section and a potential level switching section for changing a potential on an input side of the determination section; wherein the main control section causes the potential level switching section to change the potential on the input side of the determination section based on the result of the determination as to the state of the physical quantity applied to the sensor.

6. A vibration detection circuit, comprising:
an acceleration switch; and
a signal processing circuit according to claim 1;
wherein the main control section of the signal processing circuit controls the control target based on one of the result of the determination made by the main determination section of the signal processing circuit as to the vibration applied to the acceleration switch and the result of the determination made by the main determination section as to the state of the physical quantity applied to the sensor of the signal processing circuit.

7. An electronic device, comprising:
an acceleration switch;
a control target; and
a signal processing circuit according to claim 1;
wherein the main control section of the signal processing circuit controls the control target based on one of the result of the determination by the main determination section of the signal processing circuit as to the vibration applied to the acceleration switch and the result of the determination by the sensor of the signal processing circuit as to the state of the physical quantity applied to the sensor.

8. A signal processing circuit according to claim 1, wherein the main determination section is configured for connection to one terminal of the acceleration switch so as to detect an open/closed state of the acceleration switch, and for comparing a resultant detection signal to the preset first determination criterion to determine the vibration applied to the acceleration switch.

9. A signal processing circuit according to claim 8, wherein on the basis of the determination result of the main determination section, the power supply control section controls the supply of power to the main control section to perform control of activation and suspension of the main control section and perform control of switching between a low current mode and a normal operation of the main control section, and controls the supply of power to the sensor to perform control of activation and suspension of the sensor and perform control of switching between a low current mode and a normal operation mode of the sensor.

10. A signal processing circuit according to claim 9, wherein the power supply control section is configured for connection to another terminal of the acceleration switch so as to supply power to the acceleration switch and control a voltage and a current to be supplied to the acceleration switch.

11. A signal processing circuit according to claim 1, wherein the main determination section is configured for connection to one terminal of the acceleration switch by an electrode; and further comprising a load connected to an input of the main determination section through the electrode for adjusting an input-side potential of the main determination section when the acceleration switch is in the open state.

12. A vibration detection circuit comprising:
an acceleration switch to which a vibration is applied;
a sensor for detecting a physical quantity applied thereto and for outputting a result of the detection as acceleration measurement information;

a main determination section connected to the acceleration switch for comparing an output of the acceleration switch to a preset first determination criterion to determine the vibration applied to the acceleration switch;

a main control section for controlling operation of a control target based on the acceleration measurement information from the sensor; and a power supply control section for controlling supply of power to at least one of the main control section and the sensor based on the result of the determination made by the main determination section as to the vibration applied to the acceleration switch.

13. A vibration detection circuit according to claim 12, wherein the sensor detects the physical quantity applied thereto based on the power supplied from the power supply control section.

14. A vibration detection circuit according to claim 12, wherein the acceleration switch is connected to the power supply control section and controls supply of power to the acceleration switch based on the result of the determination made by the main determination section as to the vibration applied to the acceleration switch.

15. A vibration detection circuit according to claim 12, wherein the main control section compares the acceleration measurement information from the sensor to a preset second determination criterion to determine a state of the physical quantity applied to the sensor; and wherein the power supply control section controls supply of power to the acceleration switch based on a result of the determination as to the state of the physical quantity applied to the sensor.

16. A vibration detection circuit according to claim 15, further comprising a determination section including the main determination section and a potential level switching section for changing a potential on an input side of the determination section; wherein the main control section causes the potential level switching section to change the potential on the input side of the determination section based on the result of the determination as to the state of the physical quantity applied to the sensor.

17. A vibration detection circuit according to claim 12, further comprising a determination section including the main determination section and a potential level switching section for changing a potential on an input side of the determination section; and wherein the main control section causes the potential level switching section to change the potential on the input side of the determination section based on the result of the determination made by the main determination section.

18. A vibration detection circuit according to claim 12, wherein the main determination section is configured for connection to one terminal of the acceleration switch so as to detect an open/closed state of the acceleration switch, and for comparing a resultant detection signal to the preset first determination criterion to determine the vibration applied to the acceleration switch.

19. A vibration detection circuit according to claim 18, wherein on the basis of the determination result of the main determination section, the power supply control section controls the supply of power to the main control section to perform control of activation and suspension of the main control section and perform control of switching between a low current mode and a normal operation of the main control section, and controls the supply of power to the sensor to perform control of activation and suspension of the sensor and perform control of switching between a low current mode and a normal operation mode of the sensor.

20. An electronic device comprising:
the control target; and
the vibration detection circuit according to claim 12;
wherein the main control section controls the control target based on one of the result of the determination by the main determination section as to the vibration applied to the acceleration switch and the result of the determination by the sensor as to the state of the physical quantity applied to the sensor.

* * * * *